United States Patent [19]

White et al.

[11] Patent Number: 4,685,099

[45] Date of Patent: Aug. 4, 1987

[54] METHOD AND APPARATUS FOR DUPLEX COMMUNICATIONS

[75] Inventors: Donald R. White, Irvine; Michael R. Harrison, Placentia, both of Calif.

[73] Assignee: Maxon Electronics Co. Ltd., Seoul, Rep. of Korea

[21] Appl. No.: 510,631

[22] Filed: Jul. 5, 1983

Related U.S. Application Data

[63] Continuation-in-part of Ser. No. 455,854, Jan. 5, 1983, abandoned, which is a continuation-in-part of Ser. No. 379,760, May 19, 1982, abandoned.

[51] Int. Cl.⁴ .......................... H04J 1/00; H04J 15/00
[52] U.S. Cl. ...................................... 370/30; 370/32; 455/86
[58] Field of Search ....................... 370/30, 32; 455/86

[56] References Cited

U.S. PATENT DOCUMENTS

| | | | |
|---|---|---|---|
| 3,733,608 | 5/1973 | McGhay et al. | 370/30 |
| 4,032,723 | 6/1977 | Mendoza | 370/30 |
| 4,051,475 | 9/1977 | Campbell | 370/30 |
| 4,212,013 | 7/1980 | Biethan et al. | 370/30 |
| 4,231,116 | 10/1980 | Sekiguchi et al. | 370/30 |

Primary Examiner—Douglas W. Olms
Assistant Examiner—Wellington Chin
Attorney, Agent, or Firm—Gene W. Arant; Paul H. Ware; Marvin H. Kleinberg

[57] ABSTRACT

Method and apparatus for a duplex communication system wherein a local station transmits a modulated signal at a nominal, fixed frequency $f_1$ to a remote station which transmits, simultaneously, to the local station, a modulated signal at a nominal, fixed frequency $f_2$, which frequency $f_2$ is displaced from frequency $f_1$, by a frequency $|f_2=f_1|$ being the intermediate frequency of the receivers at both the first and second stations. Novel transmitter signal suppression is provided in the circuits of the local and remote stations so that a common transmit-receive antenna may be utilized at each station without swamping either receiver's front-end circuits on transmission and optimum conversion gain may be realized on reception.

19 Claims, 17 Drawing Figures

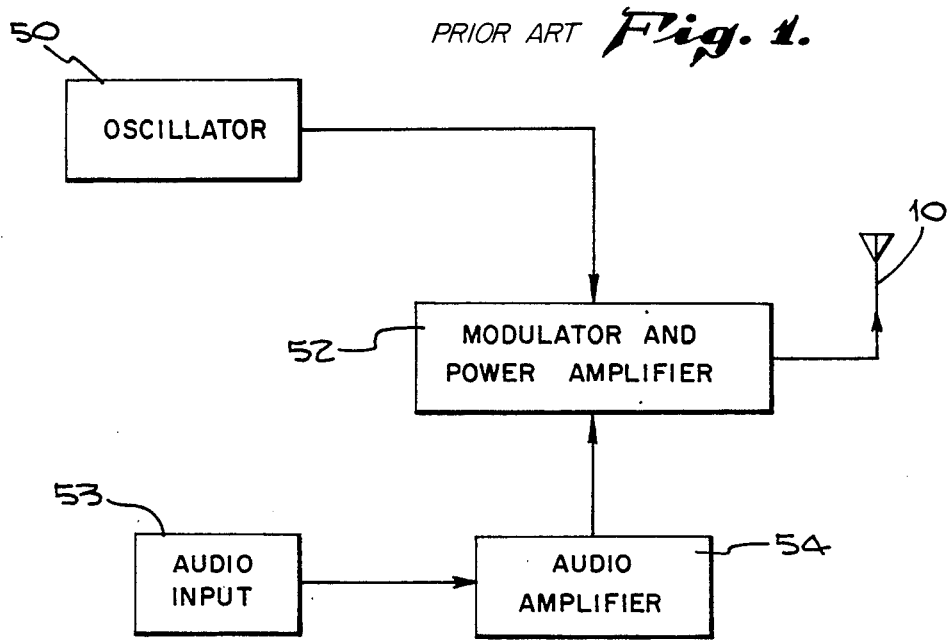
PRIOR ART Fig. 1.
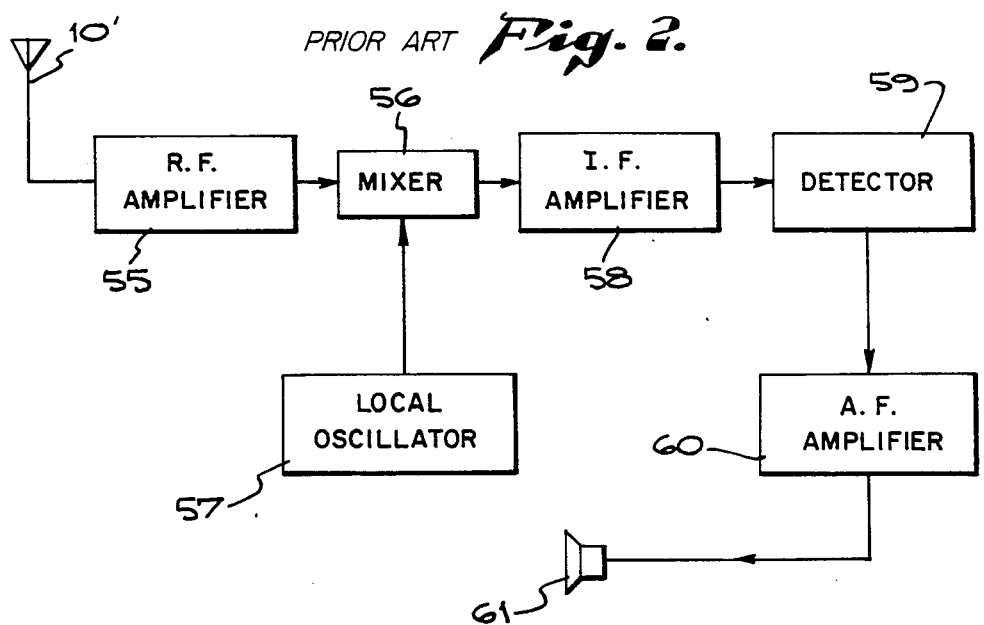
PRIOR ART Fig. 2.

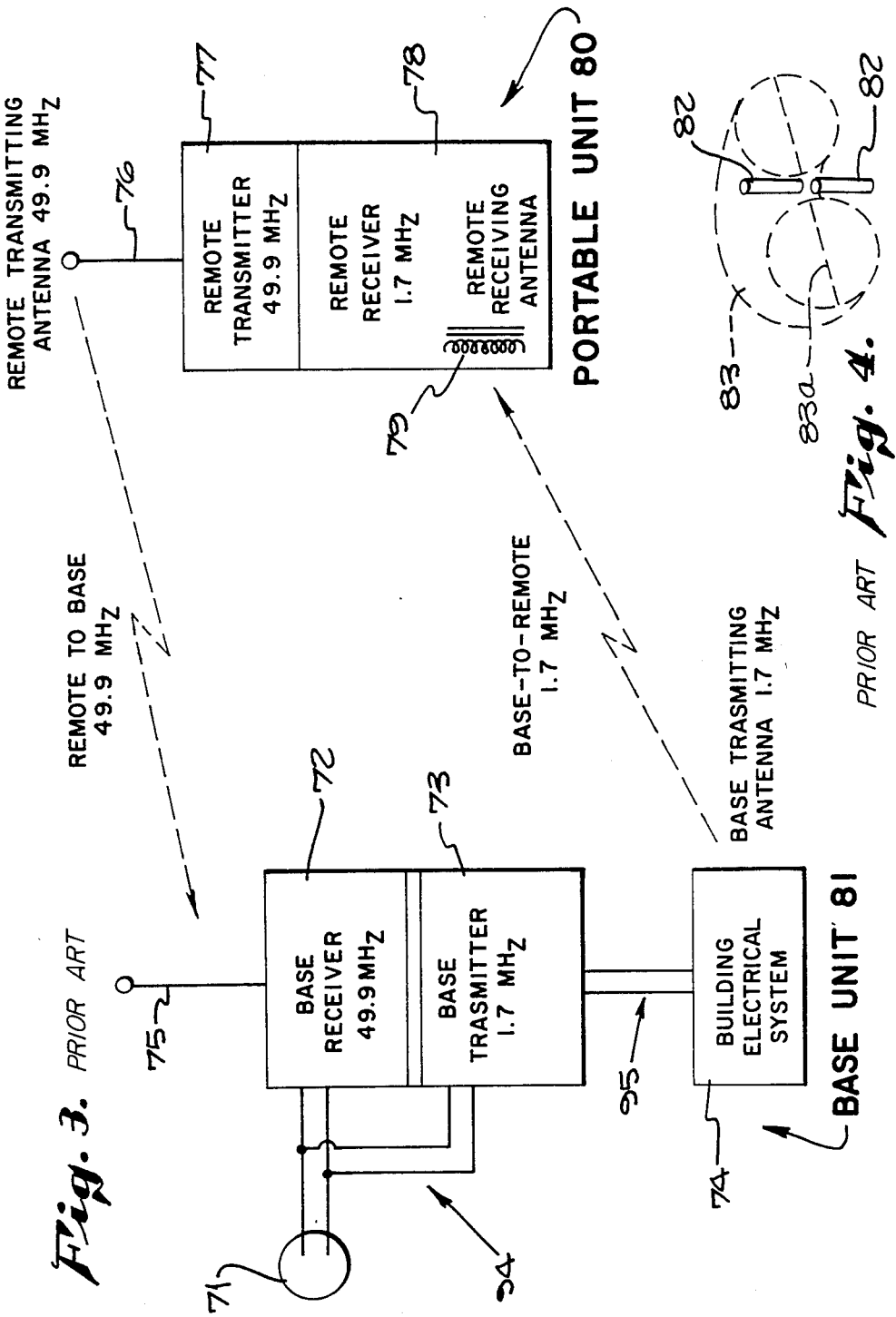

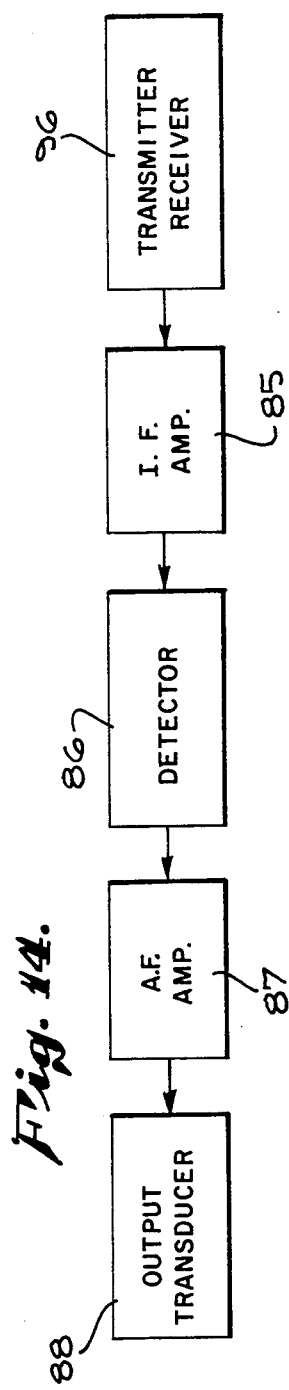
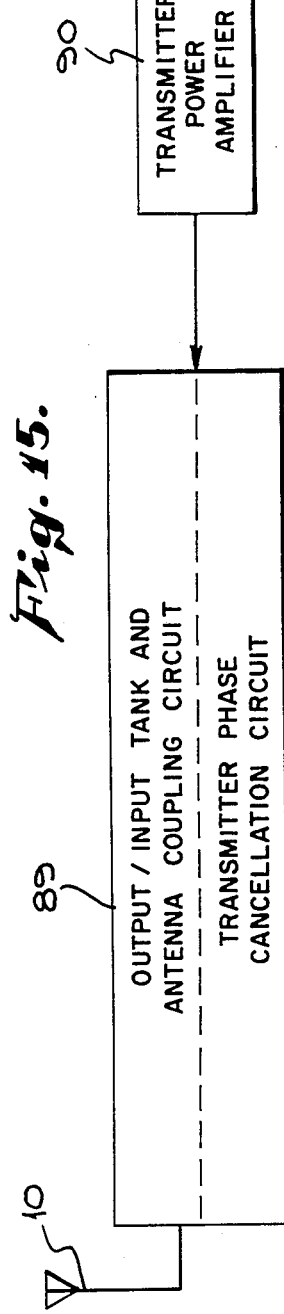
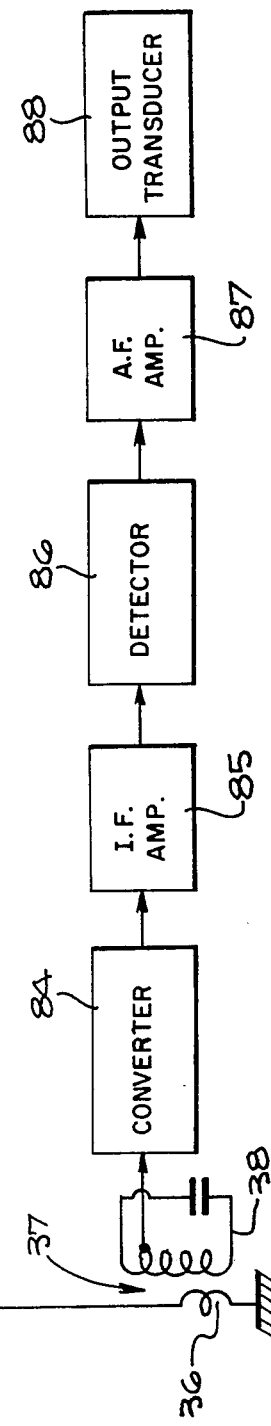
Fig. 14.
Fig. 15.

METHOD AND APPARATUS FOR DUPLEX COMMUNICATIONS

CROSS REFERENCES TO RELATED APPLICATIONS

This application is a continuation-in-part of presently pending application Ser. No. 455,854 filed 01/05/83, now abandoned, itself a continuation-in-part of prior copending application Ser. No. 379,760 filed 05/19/82, now abandoned.

BACKGROUND OF THE INVENTION

1. Field of the Invention

This invention relates generally to duplex communications systems and more particularly to a method of implementing duplex communications within a single band of radio frequencies.

2. Description of the Prior Art

A duplex communications system is defined as a communications system in which the functions of transmission and reception can be carried on simultaneously at each station in the system. Principal among the known systems are the radio telephone and the cordless telephone.

There are two basic types of land-based mobile radio telephone systems, the mobile telephone service (MTS) and the improved mobile telephone system (IMTS). In each system, the intended radio channel of communication must be selected prior to instigation of that communication. In MTS the user must manually switch between radio channels until a clear (unused-at-the-moment) channel is found. The IMTS provides an automatic scanner system which automatically searches the available radio channels until a clear one is found and then locks onto it. Both systems, however, still suffer from the inconvenience of the push-to-talk mode of operation since the transmit and receive frequencies are usually separated by a fixed frequency spacing so as to provide two-way communications. Users must press a microphone switch to transmit and then release it to receive. This mode of operation can be confusing since it usually means that each communicating user will have to say "over" or some such code word when that communicator is ready to listen to the other party speak. One caller cannot interrupt the other in such a call because, by the very nature of the system, the speaker is not listening when he is speaking.

While the radio telephone is an independent system, the cordless telephone, by contrast, is simply a means of patching into an existing conventional, hard-wired telephone system. That is, radio transmission are used to send a caller's audio signal to the remote unit from the base unit and also to send the audio signal from the operator of the remote unit to the base station and thence to the central telephone system. Thus a telephone conversation may be carried on which is indistinguishable from the same conversation being conducted over a conventional hard-wired telephone system. Voice transmission and reception may thus be accomplished concurrently. This is in contrast to the radio telephone or transceiver in which transmission and reception may not be accomplished concurrently.

The implementations of the cordless telephone range from answer-only cordless handsets to cordless devices which perform all the functions of a hard-wired telephone instrument. True cordless telephones work in conjunction with base stations connected to standard telephone lines. Maximum operating ranges may vary from about 50 feet to more than 500 feet. Most operate on the same general principles, wherein both base units and remote handsets each contain both transmitters and receivers, and whereby the base unit patches the telephone line into a transmitter which transmits to a receiver contained in the remote handset. The operator with the remote handset transmits back to a receiver in the base unit which then routes this received audio information into the hard-wired telephone line.

The cordless telephone system generally consists of two units comprising the base unit or station attached directly to the telephone line through a mating connector, and a wireless remote unit. In presently available conventional models, the base unit transmits audio information from the telephone line to which it is directly attached at a low frequency of about 1.7 MHz. The base unit also contains a receiver which is operated at about 49.8 MHz in the radio spectrum. The base unit is generally equipped with an antenna that is used only for receiving transmissions from the portable unit at this radio frequency. It is necessary to have the base unit connected directly into the AC line in the building so that it may have operating current. There is, however, another very important use made by the base unit of the wiring in the building in which it is located. The output of the 1.7 MHz base unit transmitting system is generally split through a transformer on each side of the AC line and is connected thereto through a blocking capacitor. The building electrical system then becomes a very complicated antenna system for transmission of the 1.7 MHz transmission frequency of the base unit. The remote unit has its transmission near 49.8 MHz, as has been noted, and usually contains a telescoping antenna within its case for transmitting purposes only. For reception of the base signals, the remote unit usually has a loop stick antenna located within its case. The ferrite loop antenna consists of a ferrite core wound with many turns of very small diameter wire which forms a resonance circuit at about 1.7 MHz and serves as the receiving antenna for transmissions from the base station. The reason for using a frequency near 49 MHz for transmission on the remote unit and a frequency of about 1.7 MHz for transmission from the base unit is that if the frequency of the transmitter is very close to that of the receiver in a single unit, then the close proximity of the two antennas involved will cause much of the transmitted signal to be fed into the front end of the receiver located nearby and may cause overload and even damage to circuit components. Thus the separation of about 47 to 50 MHz is adequate to prevent such interference. In this presently available conventional system, the base unit has a retractable whip antenna that is used only for the purpose of receiving transmissions from the remote unit and uses the building wiring as antenna for its own transmissions; while the remote unit has a retractable whip antenna used only for transmitting at its higher transmission frequency, information to the base station and contains also a ferrite loop antenna tuned to the approximately 1.7 MHz transmission frequency from the base station. The frequency separation here is necessary, as has been observed, in order to prevent a transmitted signal from being fed into the front end of a closely located receiver. Ferrite loop antennas, as employed in presently conventional cordless telephones, in addition to being inefficient, also suffer from extreme directivity.

It is interesting to note that the approximately 50 MHz transmission utilized by the remote unit has the capibility to travel a greater distance to be received by the base unit than the 1.7 MHz transmission has the capibility to travel from the base unit. There are several factors involved, one being that the lower frequency has more of a tendency to be absorbed by wiring systems, radio receivers in the home, and many other metallic objects and electronic devices than does the higher frequency transmission. It is also true that the ferrite loop stick antenna is much less efficient than a suitably tuned whip antenna would be. It is also true that transmission distance from the base unit will be determined to a large extent by the size and configuration of the electrical system within the building; the amount of steel and other metals used in the building construction; and whether or not the wiring in the building has been run through some sort of metal conduit. If metal conduit has been used to enclose the wiring, it will be nearly impossible to get any transmission range from the base unit because the antenna (the building wiring system) is now completely encased in a grounded metal shell.

Many different devices have been employed in the attempts to solve the problems presented. Most have either presented new problems or only partially solved the problems presented, or both. Most of the devices tried have thus met special needs as presented by specific problems and have therefore served narrow purposes. These prior art devices, among other disadvantages, have either caused unacceptable attenuation of signals, or unacceptable distortion of these same signals and thus have been unreliable and unpredictable in operation under continued use, and have been very expensive and complicated to manufacture.

OBJECTS OF THE INVENTION

It would thus be a great advantage to the art to provide a duplex communication system that is implemented with a single radio frequency band.

Another great advantage would be to provide concurrent transmission and reception without the need to cut off transmission from either location in order to receive, or to cut off reception from either location in order to transmit.

A further desirable advantage would be to provide for full duplex operation on closely spaced frequencies without the use of filters which require expensive components.

A still further beneficial advantage would be to provide an antenna system that is self-contained and independent of any building electrical wiring configuration.

An additional great advantage would be the utilization of the same antenna configuration for both transmit and receive functions.

A still further important advantage would be to provide a self-contained antenna system in a configuration that is omnidirectional.

It is therefore an object of the present invention to provide a duplex communication system that is implemented within a single radio frequency band.

A further object is to provide a duplex communication system, capable of concurrent transmission and reception without the need to cut off transmission from either location in order to receive or to cut off reception from either location in order to transmit.

Yet another object of the present invention is to provide for full duplex operation on closely spaced frequencies without the use of filters.

Another important object of the invention is to provide an antenna system that is self-contained and independent of any building wiring configuration.

An additional object of the present invention is to utilize the same antenna for both transmit and receive functions.

A further important object of the invention is to provide the above self-contained antenna system in a configuration that is nondirectional.

SUMMARY OF THE INVENTION

According to the present invention, a duplex communications system is provided in which full duplex operatin on closely spaced frequencies is achieved without the use of filters. Additionally, a portion of transmitter energy is utilized in the implementation of a first local oscillator at each station location so as to develop an intermediate frequency.

According to the basic concept of the present invention, at each of the stations a portion of the local transmitter signal, comparable in magnitude to the signal received from the remote transmitter and differing in frequency from that remote transmitted signal by the intermediate frequency, is applied to the local converter circuit along with the received signal from the remote transmitter. Thus, an intermediate frequency signal, modulated with the intelligence transmitted from the remote statin, is derived. This signal is then processed so as to recover the transmitted information.

In keeping with this basic concept, according to the illustrated embodiments of the present invention, at each of the stations, there is generated concurrently with the transmitter output signal, a cancellation or image signal which is nearly equal in magnitude and substantially opposite in phase. The transmitter output signal and the cancellation or image signal are applied concurrently to the associated receiver unit so as to thereby supply a greatly weakened version of the transmitter output signal to the receiver circuit, thus effectively providing a local oscillator signal. Thus in the receiver circuit, the received incoming signal and the weakened transmitter output signal are of comparable magnitudes, thereby making it possible to produce a heterodyne action for recovering the intelligence, an audio signal, from the incoming signal.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings, wherein like reference characters refer to like parts throughout and in which:

FIG. 1 is a high level block diagram of a conventional prior art transmitter.

FIG. 2 is a high level block diagram of a conventional prior art receiver.

FIG. 3 is a high level block diagram of a conventional prior art cordless telephone base and remote units.

FIG. 4 is an idealized radiation pattern from a prior art dipole antenna.

FIG. 14 is a high level block diagram of one station in the duplex communication system of the invention.

FIG. 15 is another high level block diagram of one station emphasizing the first embodiment of the duplex communication system of the invention.

DETAILED DESCRIPTION

Figure 5:
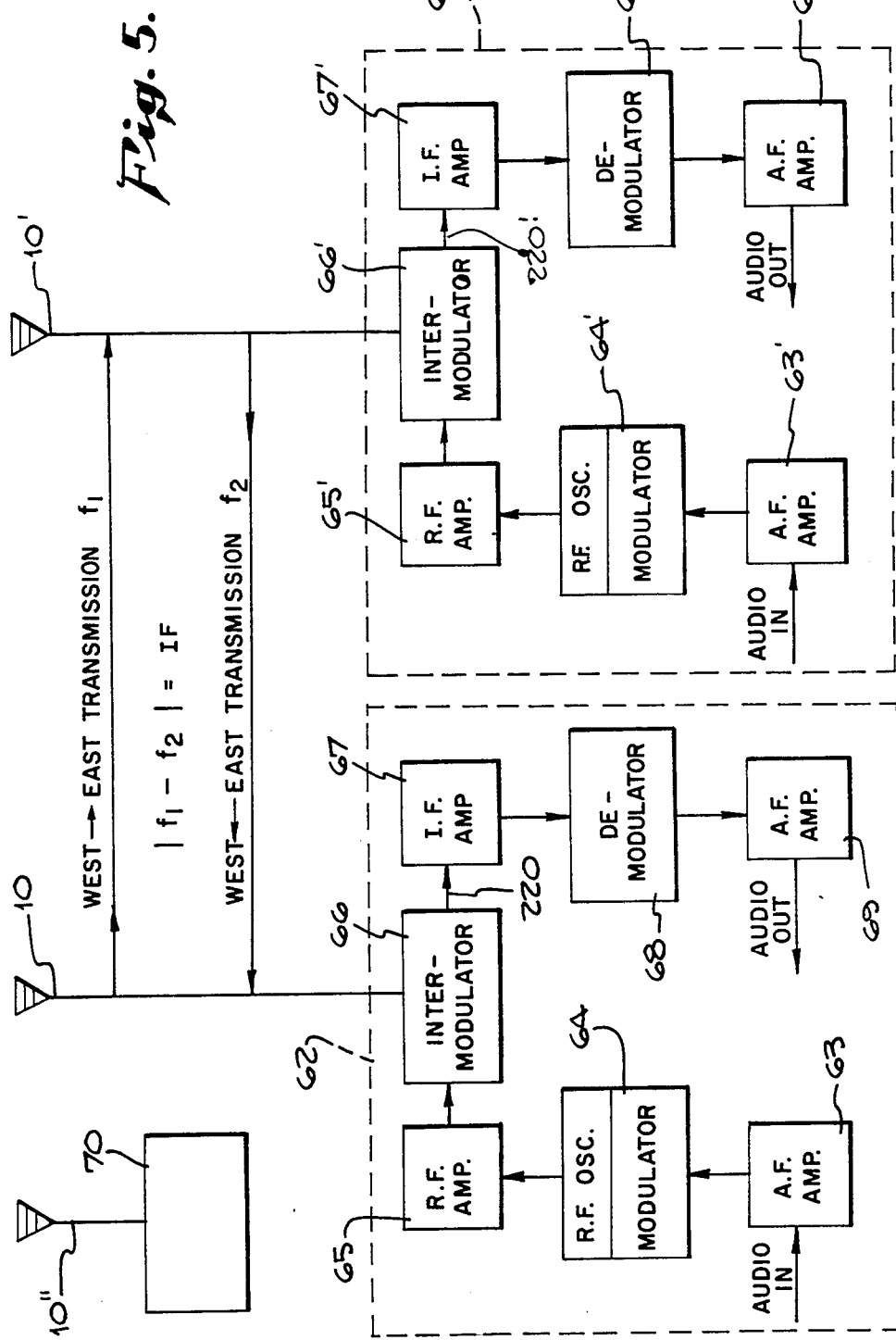
FIG. 5 is a block diagram of a duplex communications systems according to the present invention.

Although specific embodiments of the invention will not be described with reference to the drawings, it should be understood that such embodiments are by way of example only and merely illustrative of but a small number of the many possible specific embodiments which can represent applications of the principles of the invention. Various changes and modifications, obvious to one skilled in the art to which the invention pertains are deemed to be within the spirit, scope and contemplation of the invention as further defined in the appended claims.

Referring to FIG. 1 with greater particularity, the general operation of a conventional transmitter may be examined. A radio frequency oscillator 50 provides its input into a modulator and power amplifier 52. At the same time an audio input function denoted by the numeral 53 is furnished to an audio amplifier system 54 and also applied to modulator and power amplifier 52. The combined output of oscillator 50 and audio amplifier 54 developed in modulator and power amplifier 52 is then furnished to transmitting antenna 10 to be radiated into space.

In FIG. 2, receiving antenna 10' intercepts some of the radiated signal from a conventional transmitter as described with respect to FIG. 1. This very small signal is applied to the front-end circuits of the conventional receiver shown in FIG. 2 as radio frequency amplifier 55. Radio frequency amplifier 55 furnishes its output signal to mixer 56 which also receives input from local oscillator 57 so as to develop an intermediate frequency. This intermediate frequency signal is furnished to intermediate frequency amplifier 58 for amplification. Signal detection for recovery of the received intelligence is accomplished in detector 59 which receives the amplified intermediate frequency signal from the intermediate frequency amplifier 58, and the detected signal is furnished to audio frequency amplifier 60. This audio frequency signal is now amplified and fed to output transducer 61 shown here as a loudspeaker.

In the foregoing, the functions of transmission of audio information and reception of audio information have been carried out independently of each other. Various problems arise however, when an attempt is made to combine these two functions in close physical proximity to each other, and also when an attempt is made to use the same antenna both for transmission and for reception.

With reference to FIG. 3, there is illustrated a duplex communications system in the specific form of a conventional cordless telephone system, however, having many disadvantages that have been successfully attacked and solved by the present invention.

All true cordless telephones normally work in conjunction with a standard telephone system. The cordless telephone, as an example of a duplex communications system must not be confused with the radio telephone, although basic principles are the same. Present cordless telephones merely provide apparatus, method and means for tapping into an existing hard-wired telephone system. As illustrated, a base unit 81 comprises a base receiver 72 and a base transmitter 73, both connected to the building telephone system by hard-wired telephone connecting wires 94 into receptacle 71. This base unit is also connected to the building electric power system denoted by the numeral 74 by hard-wire electrical connecting wires 95. The wires 95, by means of suitable blocking capacitors, not specifically shown, are also employed to connect the base unit transmitter to the building's wiring system which will then act as antenna for the transmitter's transmission frequency, normally about 1.7 MHz. Base station 81 also has a whip antenna 75, however, this antenna has no purpose other than reception of signal transmissions from remote portable unit 80 at its normal transmission frequency of about 49.9 MHz.

Remote portable unit 80 comprises a transmitter 77 and a receiver 78. Because of the frequency difference between transmission frequencies in the base unit and the portable unit, the remote portable unit also has two antennas, remote receiving antenna 79 for receiving the 1.7 MHz transmission from the base unit 81 and remote transmitting antenna 76 for transmitting the 49.9 MHz remote transmission signal to the base station. It is to be noted that base unit 81 and remote portable unit 80 have antennas 75 and 76, respectively, that are conventional whip antennas.

The conventional whip antenna exhibits an omnidirectional radiation pattern. Reference to FIG. 4 shows the radiation pattern 83 of dipole antenna 82. Here the two elements forming the dipole are shown in vertical orientation so that the radiation pattern obtained is doughnut shaped, that is, a torus. In general, a whip antenna comprises the top dipole in physical form and a bottom dipole is provided as a reflected image from a ground plane. If we slice horizontally through the center of the torus 83 as shown at dotted line 83a, we will see the ideal radiation pattern of a whip antenna thus illustrating its omnidirectivity. One of the problems attacked and solved by the present invention is the problem of the antennas. In the present invention instead of using separate antennas for transmission and reception, the same whip antenna is utilized for the performance of both functions simultaneously.

PRIOR ART METHODS

In order to set forth more clearly how the duplex communications system of the present invention differs from other full duplex communications systems in operating on closely spaced frequencies, using a portion of the local transmitter signal energy as a first local oscillator, and in not using filters, a statement of problems involved and conventional attempted solutions may be helpful.

The performance of a full duplex communications system depends in large measure on the ability to attenuate the effect upon the local receiver, of the local transmitter power delivered to the antenna. In some existing systems, a switching function is performed to prevent the transmitter signal energy from entering the front end of the local receiver; thus, during the time of effectivity of this switching function, the local receiver is inoperable and thus no true duplex communications system is achieved.

When operating frequencies of transmitter and receiver are widely different, for example, 1.7 MHz and 49.9 MHz for a frequency separation of 48.2 MHz, the problems involved in receiver front end isolation are fairly simple and straightforward. However, when the involved frequencies are within one or two percent or less of each other, the problems become much more complex, particularly where the same antenna is to be used for both transmitting and receiving functions. The primary problem remains the high transmitter signal energy present at the front end of the receiver. This high transmitter energy present at the input to the local receiver must be reduced to an acceptable level, that is, a level which will not cause desensitization or overload damage in the receiver's radio frequency amplifier, converter or intermediate frequency strip. In most receivers, the acceptable signal level is at most a very few millivolts, and hence a small fraction of the transmitted signal.

The standard solution to the problem of transmitter interference in the receiver has been to use filters in the receiver front end to allow passage of the desired received signal, while at the same time reducing the transmitter power, and in the low power stages of the receiver, to reduce the associated base band noise which would also reduce the receiver sensitivity.

METHOD OF THE INVENTION

In the duplex radio telephone communications system of the present invention as shown in FIG. 5, station 62 may be designated the local station in the system and 62' the remote station. Station 62 has an audio signal input to audio frequency amplifier 63. The output of audio amplifier 63 is coupled to radio frequency oscillator and modulator 64. Radio frequency oscillator and modulator 64 furnishes input signal to radio frequency amplifier 65. The output of radio frequency amplifier 65 raises the signal level of the modulated radio frequency signal to that level desired before application to antenna 10. The output of radio frequency amplifier 65 is coupled to intermodulator 66 which, in turn, is coupled to antenna 10. Antenna 10 acts in both the transmit and receive modes. Intermodulator 66, in addition to furnishing the signal from radio frequency amplifier 65 to antenna 10, also provides an intermediate frequency signal at its internal output 220 as a result of intermodulation between the signal from radio frequency amplifier 65 and the signals received at antenna 10 transmitted from remote station 62'. This intermediate frequency signal is fed to intermediate frequency amplifier 67 whose output signal is coupled to demodulator 68. The output of demodulator 68, the recovered intelligence broadcast from station 62', is coupled to audio frequency amplifier 69 for amplification prior to being supplied to a transducer, for example a loudspeaker. Of fundamental importance is the concurrent generation of a cancellation or image signal, approximately equal to magnitude and essentially opposite in phase to the signal furnished by intermodulator 66 to antenna 10. The immediate effects of the application of this out-of-phase cancellation signal are of great importance to the present invention. First of all, the simultaneous application of the transmitter output signal and the cancellation signal to the receiver front end input circuits results in a greatly weakened version of the transmitter signal being effective at the receiver input circuits thus greatly reducing the effect upon the local receiver of the local transmitter power delivered to the antenna. Next, this greatly weakened version of the transmitter signal applied to the receiver provides an effective local oscillator signal. The received signal from remote station 62' and this weakened transmitter signal are of comparable magnitudes and thus may be heterodyned together so as to produce the intermediate frequency signal required for the operation of the system.

In station 62', the remote station, audio signals may be received at the input terminal to audio frequency amplifier 63'. The amplified signal from audio frequency amplifier 63' is coupled to radio frequency oscillator and modulator 64'. A radio frequency carrier signal is furnished by radio frequency oscillator and modulator 64' at a frequency which differs from the carrier frequency of radio frequency oscillator 64 by a predetermined amount, the intermediate frequency. The output signal of radio frequency amplifier 65', as before, raises the level of the modulated radio frequency signal to that level desired at antenna 10' for broadcast. Intermodulator 66' provides the same service for remote station 62' as is provided by its counterpart in station 62. Thus a greatly weakened version of the transmitter signal is effective at the receiver input circuits and the effective local oscillator signal is provided.

At this point it should be evident that the unprimed and primed numerals refer to like elements in local and remote stations where, by our convention, the local station bears the unprimed numerals.

Signals received at antenna 10 of local station 62 from remote station 62' are intermodulated with a controlled portion of the signal from radio frequency amplifier 65 to at output terminal 220 of intermodulator 66 an intermediate frequency signal which is amplified in intermediate frequency amplifier 67 and then passed on to demodulator 68 for recovery of the original intelligence transmitted from station 62'.

Contemplated operation of this system of the invention is explained as follows. A voice signal is applied to audio frequency amplifier 63 which, after amplification modulates a radio frequency carrier signal. After amplification in radio frequency amplifier 65, the amplified, modulated signal is then applied to antenna 10 through intermodulator 66 and a modulated signal is broadcast at a nominal carrier frequency of, for example, 49.830 MHz. By application of the signal cancellation techniques of the invention, a greatly weakened version of the transmitter signal at this same 49.830 MHz is applied to the receiver input circuits of station 62.

In station 62', similar functions are being performed except that the source of the audio input to audio frequency amplifier 63' may be the voice of the operator of that remote station. The radio frequency oscillator carrier signal in the remote station has a frequency of, for example, 49.860 MHz so that the signal transmitted from antenna 10' is a radio frequency signal, nominally at 49.860 MHz, but modulated by the audio signal derived from the remote operator's voice. Again, the signal cancellation techniques of the invention provide a greatly weakened version of this transmitter's signal at 49.860 MHz to this receiver's input circuits.

At station 62, the small incoming signal from station 62' at 49.860 MHz is mixed in with the small fraction of the 49.830 MHz signal from radio frequency amplifier 65, thus producing an intermodulation product at 30 KHz. This is the frequency of the signal which appears at terminal 220 of intermodulator 66. Intermediate frequency amplifier 67 is tuned to 30 KHz and appropriately amplifies the modulated signal received from terminal 220. The intermediate frequency signal thus derived may be demodulated in demodulator 68 and the resulting audio frequency signal amplified in audio frequency amplifier 69 from which it is applied to an audio transducer, for example, a loud speaker.

At station 62', which in this case we have designated the remote station, the incoming signal broadcast from station 62 at 49.830 MHz is received at antenna 10' and is fed into intermodulator 66', where it is mixed with a small fraction of the signal from radio frequency amplifier 65' which signal is nominally at 49.860 MHz and the intermodulation product of 30 KHz appears at terminal 220' of intermodulator 66' from whence it passes to intermediate frequency amplifier 67'. Again, the intermediate frequency signal appearing at terminal 220' is a 30 KHz signal modulated with the audio signal derived from the station 62 operator's voice. That modulated intermediate frequency signal is amplified by a 30 KHz amplifier in an intermediate frequency amplifier 67' and is fed to demodulator 68' from which an audio signal is extracted and applied to audio frequency amplifier 69' and thence to a transducer as before. Because system intermediate frequency amplifiers operate on the difference frequency, it is apparent that a second remote station, such as station 70 could communicate with station 62' if the second station has its nominal frequency set at 49.890 MHz.

Figure 6:
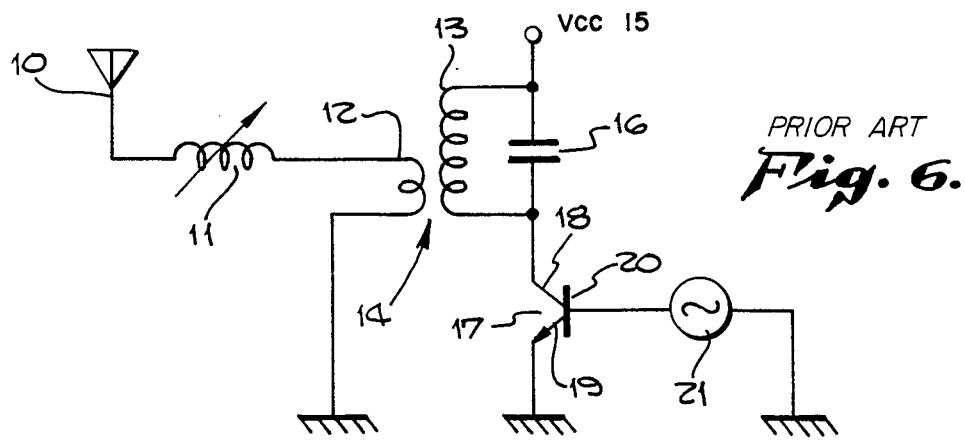
FIG. 6 is a schematic diagram of a simple prior art transmitter circuit.
Figure 7:
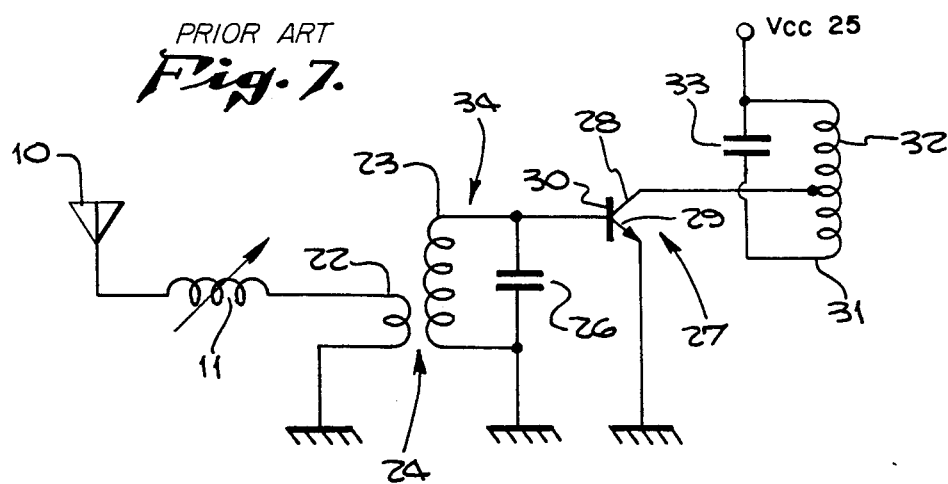
FIG. 7 is a schematic diagram of a simple prior art receiver front-end circuit.

It is instructive in developing the presently preferred embodiment of the invention, to examine in FIGS. 6 and 7 conventional transmitter and receiver input circuits, respectively. The conventional transmitter output transformer 14 has a tuned primary 13 which is connected to supply voltage 15 and to the collector 18 of the output device, transistor 17. The secondary 12, usually a few turns, is then connected between ground and the antenna circuit as shown in FIG. 6. Antenna 10 is connected through antenna tuning circuit 11 to transformer secondary 12. The transformer tuning capacitor is represented by the numeral 16. Signal source 21 furnishes input signal to the base 20 of transistor 17 whose emitter 19 is shown as grounded. Transmitter primary winding 13 and tuning capacitor 16 are connected in parallel between the supply voltage terminal 15 and collector 18 of transistor 17. This circuit allows efficient transfer of power to the antenna. If this general circuit configuration is used as a receiver input circuit, it will transfer energy from the antenna to the radio frequency amplifier 34 as shown in FIG. 7. Received signal energy incident at antenna 10' will be transferred by antenna tuning circuit 11 into transformer 24 by means of primary 22. Tuned secondary comprising the coil 23 and capacitor 26 transfers signal energy into the base 30 of transistor 27. The emitter 29 of transistor 27 is shown as grounded. The collector 28 of transistor 27 transfers signal energy into tuned circuit 31 comprising coil 32 and capacitor 33. Tuned circuit 31 is connected to supply voltage by means of terminal 25.

Figure 8:
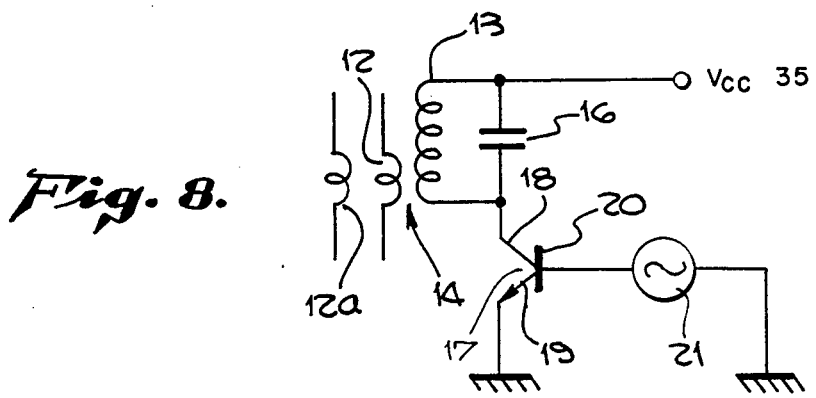
FIG. 8 is a schematic diagram of a part of a simple transmitter circuit showing two secondary transformer coupling windings helpful in developing an important embodiment of the present invention.
Figure 9:
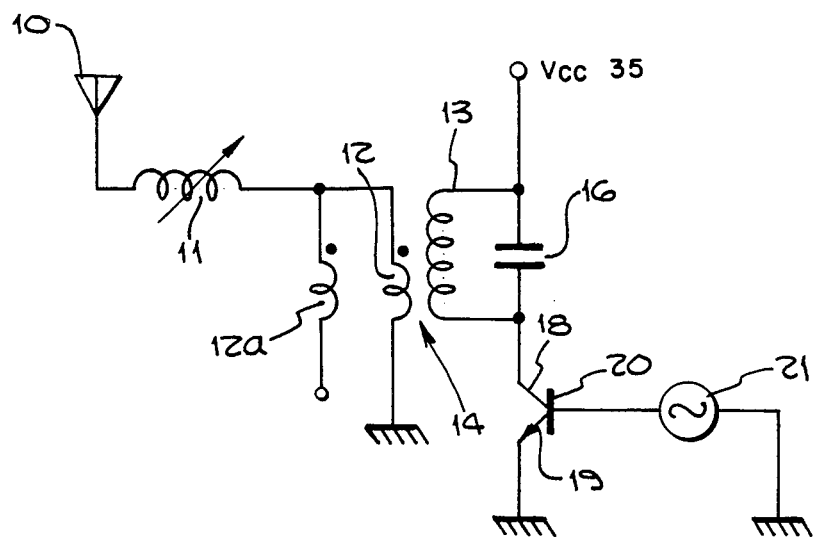
FIG. 9 is a schematic diagram of the transformer circuit of FIG. 8, showing both secondary transformer windings connected to the antenna while leaving one winding unterminated.
Figure 10:
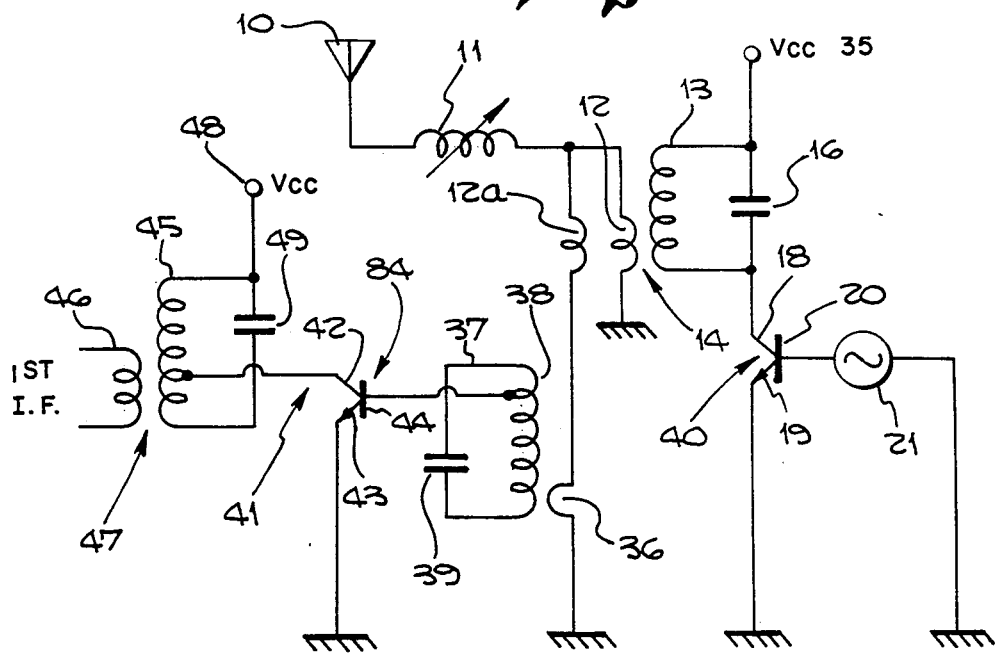
FIG. 10 is a schematic diagram of combined simple transmitter circuit and receiver front end circuits, both coupled to the antenna according to a first embodiment of the present invention.

Referring now to FIG. 8, we know from elementary transformer theory that if the output transformer 14 has two identical secondary windings, 12 and 12a, the voltages induced across the two secondaries will be very nearly equal. If we now connect one of the two identical secondary windings 12 between the antenna circuit and ground, and connect the remaining secondary winding 12a, in-phase to the antenna circuit leaving one end unterminated, we will have the configuration of FIG. 9. And importantly, we have the standard transmitter circuit of FIG. 6 with no change in performance. If we now measure the transmitter energy present at the unterminated end of the remaining secondary winding 12a and ground, we find that it is nearly zero. It will not be exactly zero because of small differences between the two secondaries and between their degrees of coupling to the primary winding. We have thus accomplished a direct connection to the antenna circuit with virtually no transmitter energy present. By terminating the unterminated end of secondary winding 12a to a tank circuit tuned to the receiver frequency, it is possible to optimize the transmitter signal energy level necessary for a converter stage as is shown in FIG. 10. The bipolar junction transistor arrangement shown, however, is not intended to limit or in any way detract from the generality of the invention as taught and described.

In FIG. 10, the transmitter signal generated in signal generator 21 is furnished to the base 20 of transmitter 40 whose emitter 19 is shown grounded. Collector 18 provides its signal energy to transmitter output primary 13 tuned by capacitor 16, to transmitter transformer 14. Transformer output secondary 12 then furnishes this transmitter power to antenna 10 by way of antenna tuning circuit 11. Secondary winding 12a develops substantially the same signal as winding 12, but since the two windings are connected in back-to-back relationship, there is only very low transmitter signal energy present at the bottom of the winding 12a and thus very low transmitter signal energy will be transferred to tank circuit 37 of converter 84 by coupling coil 36 so as to produce a greatly weakened version of said transmitter output signal which in effect is a local oscillator signal.

When a signal is received by antenna 10, it will proceed through winding 12a and be linked by coupling coil 36 to tank circuit 37 along with the very low transmitter signal energy already present. As is conventional, converter 84 comprises tank circuit 37, itself comprising tuning capacitor 39 with coil 38. Output signal from tank circuit 37 is furnished to the base 44 of a second transistor 41 whose emitter 43 is grounded. The collector 42 of transistor 41 is in turn connected to transformer 47, comprising tuned primary 45, tuning capacitor 49 and secondary 46. Supply voltage is furnished by terminal 48. Converter 84 thus develops an intermediate frequency signal representing the difference frequency between the transmitter frequency and the frequency of the received signal, while at the same time preventing an unacceptable signal level from the transmitter being incident at the receiver front end. Again, the bipolar junction transistor arrangement shown is not intended as a limitation on the invention.

Figure 11:
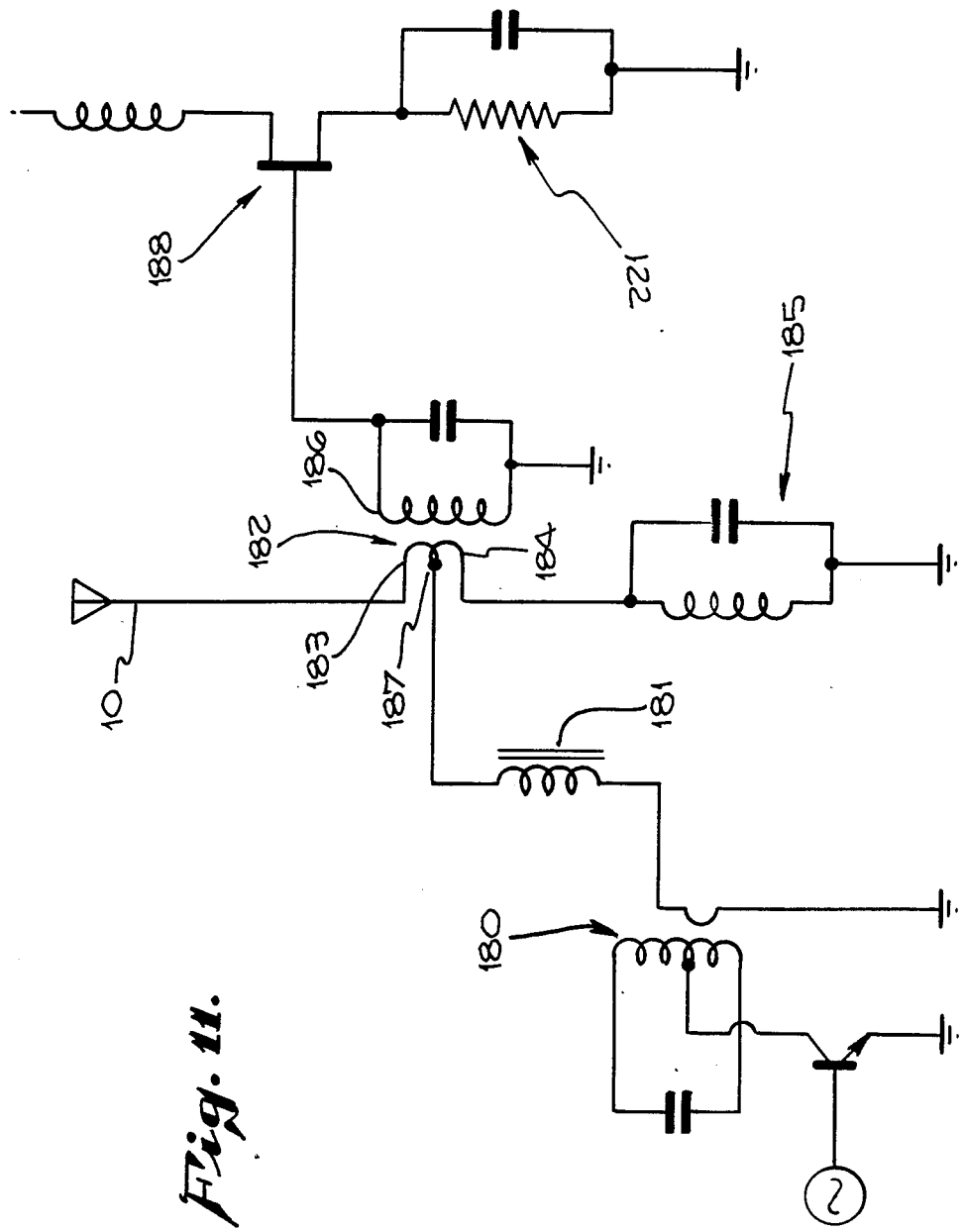
FIG. 11 is a schematic diagram showing implementation of a second embodiment of the invention.

FIG. 11 illustrates a second embodiment which provides for cancellation of the transmitter signal in the input receiver circuit. The transmitter signal energy developed in the tank circuit 180 is first directed through an antenna loading coil 181 before being applied to tap 187 of the input transformer 182. Input transformer 182 has two winding portions, 183 and 184. First winding portion 183 is connected to one end to tape 187 and at its other end to antenna 10. Second winding portion 184 is also connected at one end to tap 187 and at its other end to resonant circuit 185. A portion of the transmitter signal energy thus flows in one direction in input transformer 182 toward the antenna 10 by means of first winding portion 183 while another portion flows in the opposite direction in input transformer 182 toward resonant circuit 185 by means of second winding portion 184. A near null signal is thus induced in the secondary 186 of input transformer 182 as a result of the incidence of the transmitter signal energy, however, a small portion of transmitter signal energy of an order of magnitude suitable for conversion is realized.

When an incoming signal is incident at antenna 10, it travels through input transformer 182. A smaller portion travels through antenna loading coil 181 and the transmitter winding. However, because of resonant circuit 185, the amount of received signal energy in the antenna loading coil 181 path will be significantly less than the amount developed across the receiver input windings 183 and 184. The antenna loading coil is normally placed between the source of the transmitter signal energy and the antenna. In this embodiment of the invention, however, the antenna loading coil 181 has been placed between the cancellation windings, 183 and 184 of input transformer 182, and the transmitter winding. Such placement has been effected in order to prevent a shunt capacitance from affecting the near null transmitter signal induced in the secondary 186. The difference in current flow is always common to both windings, since the common source of current through the antenna loading coil is common to both windings. Thus, transmitter signal energy is nearly nullified in the receiver tank circuit 186 and received signal energy is induced into winding 186 of the receiver tank circuit, being the sum of the signals developed through windings 183 and 184 so that signal mixing takes place in the converter field effect transistor 188. The field effect transistor source connection into circuit 221 is entirely conventional and need not be further examined here. The field effect transistor configuration is not intended to limit the invention to that or any other specific method of performing signal conversion.

Figure 12:
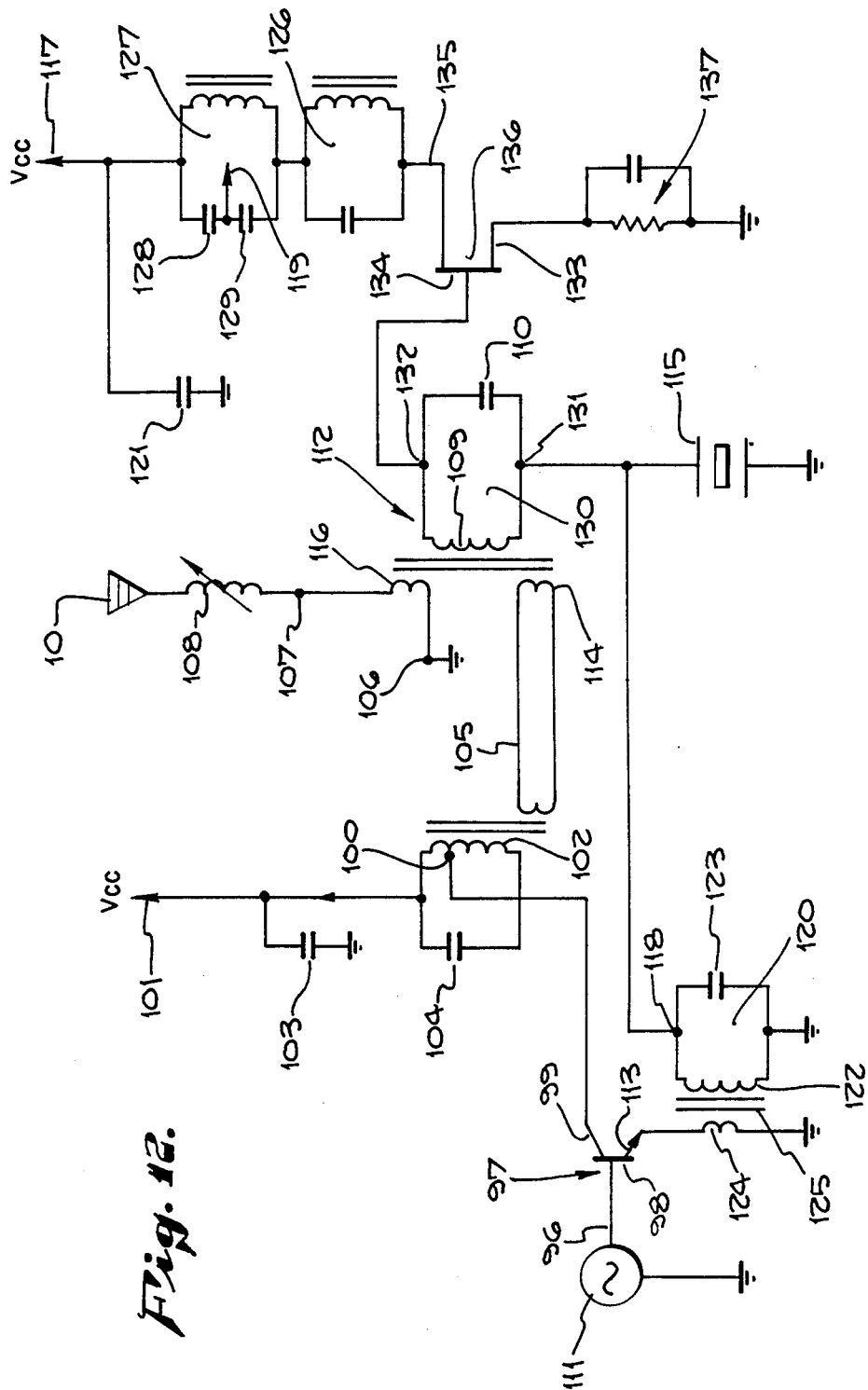
FIG. 12 is a schematic diagram showing implementation of a third embodiment of the invention.

FIG. 12 presents another embodiment of the invention which permits the use of a predetermined portion of the transmitter signal at a fixed nominal frequency to beat with the incoming signal from a communicating station to produce the desired intermediate frequency signal. In FIG. 12 a modulated signal at a frequency, again for example, of 49.860 MHz generated as at 111 is applied to terminal 96 for application to bipolar transistor 97 at its base 98. An amplified signal at a nominal frequency of 49.860 MHz appears at collector 99 of transistor 97 and is supplied to coil tap 100 on tank coil 102, which is shunted by tuning capacitor 104. Operating voltage for transistor 97 is applied through terminal 101. Terminal 101 is by-passed to ground through by-pass condenser 103. The tank circuit comprising tank coil 102 and tuning condenser 104 has been designed to present a high impedance at the nominal frequency of 49.860 MHz. The tank circuit comprising tank coil 102 and condenser 104 is link-coupled by means of a low-impedance link 105 to a second transformer 112 through a first primery 114. Transformer 112 also has a second primary winding 116 which is connected to one end 106 to ground and at the other end 107 through an antenna tuning coil 108 to antenna 10. Secondary winding 109 of transformer 112 is shunted by a condenser 110 to tune it to the nominal frequency of 49.860 MHz. The Q of the tank circuit 130 comprising condenser 110 and coil 109 is such that its half-width is about 100 KHz. Because of this band width, tank circuit 130 accommodates both the transmitted signal generated at oscillator 111 at a nominal frequency of 49.860 MHz and the signal received at antenna 10 which has a nominal frequency, again for example, of 49.830 MHz. The impedance looking into tank circuit 130 is high, for example, 100,000 ohms. Terminal 132 of tank circuit 130 is coupled to gate 134 of field effect transistor 136, which has a high input impedance at gate 134. Terminal 131 of tank circuit 130 is coupled to terminal 118 of tank circuit 120 which comprises a tank coil 122 shunted by a tuning condenser 123, the combination being tuned to a nominal 49.860 MHz. Again, tank circuit 120, like tank circuit 130, has a high impedance at the nominal frequency of oscillator 111. Tank coil 122 forms the secondary winding of a transformer 125, the primary 124 of which is in the circuit from emitter 113 of bipolar transistor 97 to ground. The emitter current at the frequency of oscillator 111 is 180 degrees out of phase with the collector current at the frequency of oscillator 111. The relationship of the windings of tank circuit 120 and tank circuit 130 is such that the signal at the frequency of oscillator 111 appearing at terminal 118 is 180 degrees out of phase with the signal at the same frequency appearing at terminal 131 of tank circuit 130. Thus, between gate 134 connected to terminal 132 of tank circuit 130, and ground, the signal approaches zero through the cancellation effect just described. To enhance the effective level of the signal received by antenna 10 at the nominal frequency of 49.830 MHz, a crystal or magnetostrictive filter 115 may be coupled between terminal 131 of tank circuit 130 and ground. Device 115 may have a pass-band of only 3 KHz and it is tuned to the frequency of the signal received in antenna 10 namely, for example, 49.830 MHz. Thus the signal received from antenna 10 is enhanced as it is applied to gate 134 of field effect transistor mixer 136, whereas a signal from oscillator 111 is reduced to a level of the order of $10^{-3}$ volts by reason of the cancellation effects between tank circuits 130 and 120. This reduction of the signal from oscillator 111 before it is utilized to heterodyne with the signal received in mixer 136 is necessary to get an acceptable mixer conversion factor. It is well established that if the ratio of two signals being mixed is too great, the efficiency in the mixer is greatly reduced. Therefore, the present cancellation method is necessary and desirable to achieve efficient mixing and reasonable conversion gain. The output from drain 135 of field effect transistor 136 is coupled through a carrier frequency trap 126 to a tank circuit 127 tuned to the desired intermediate frequency, in this case, 30 KHz, by a pair of capacitors 128 and 129. The reactance of capacitor 128 is lower than that of capacitor 129 at the operating frequency. Output to the intermediate frequency amplifying transistor is taken from terminal 119. Terminal 117 is by-passed to ground for radio frequency purposes by by-pass condenser 121. Source 133 of field effect transistor 136 is coupled to ground through a biasing network 137.

Figure 13:
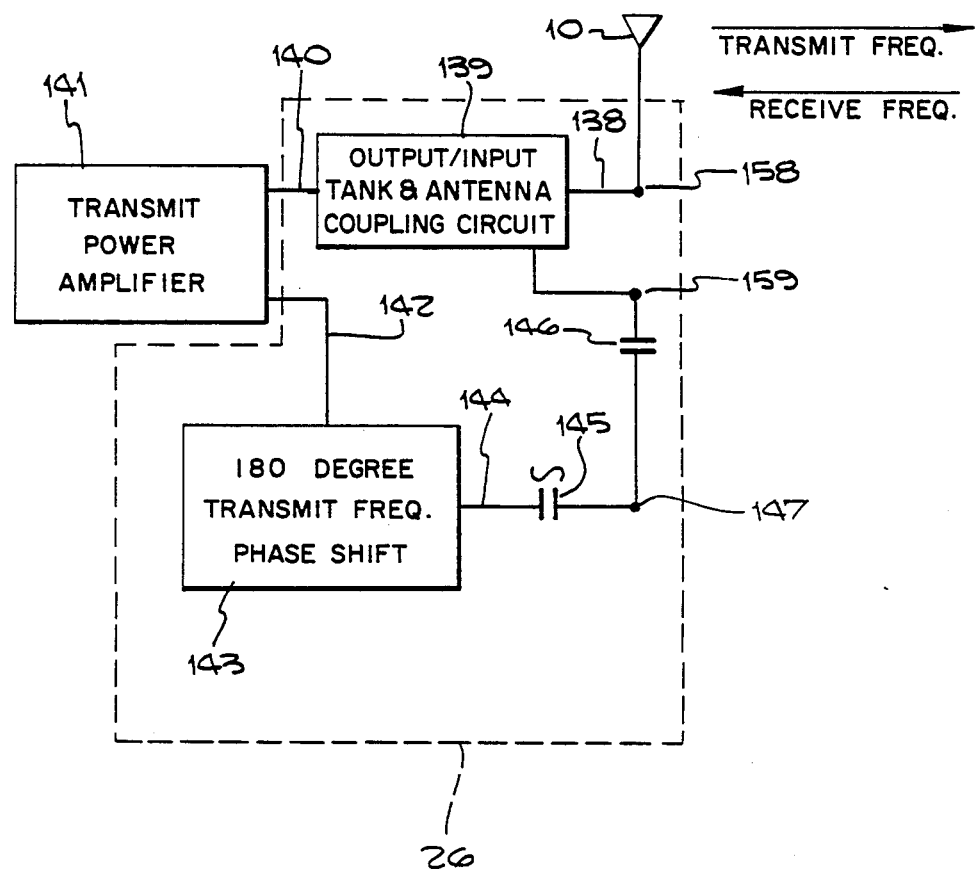
FIG. 13 is a block diagram of one station in accordance with the invention, helpful in further explaining and amplifying the novel advantages of the invention.

Directing particular attention now to a fourth embodiment of the invention shown in FIG. 13, a modulated signal may be received at antenna 10, for example, at a nominal frequency of 49.860 MHz and applied by means of a lead 138 to antenna coupler 139. Antenna coupler 139 additionally receives signal input of a modulated signal at a nominal frequency of, for example, 49.830 MHz by means of a signal lead 140 from transmitter power amplifier 141. Amplifier 141 additionally furnishes its signal on lead 142 to phase-shifter circuit 143. The resulting signal, shifted in phase by 180 degrees is furnished by signal lead 144 to capacitor 145. This shift in phase is emphasized by the legend in block 143 of FIG. 13. At point 158 of FIG. 13, both the in-phase transmitter signal, in our example at nominal frequency of 49.830 MHz and the received signal, in our example at nominal frequency 49.860 MHz are present and are thus applied by means of signal lead 159 to capacitor 146. At the same time, the transmitter signal in our example, also at a nominal frequency 49.830 MHz but shifted in phase by 180 degrees, is applied by means of signal lead 144 to capacitor 145. Obviously the two signals in addition to being 180 degrees out-of-phase, also are of somewhat different magnitudes, thus summing point 147, the junction of capacitors 145 and 146, will see a signal that contains, in addition to the received signal, a local transmitter signal that has been attenuated by a factor dependent on the relative strengths of in-phase and out-of-phase local transmitter signal applied.

Referring to FIG. 14, a high level block diagram shows transmitter receiver/converter 96 providing output to intermediate frequency amplifier 85. The amplified intermediate frequency from intermediate frequency amplifier 85, as is conventional, is applied to some form of detector 86. Detector 86 thus develops an audio frequency signal which is applied to audio frequency amplifier 87 whose output in turn is applied to output transducer 88, most commonly a loudspeaker.

FIG. 15 emphasizes the importance of coupling coil 36 of FIG. 10 in providing tank circuit 37, comprising capacitor 39 and coil 38, with both a received signal from antenna 10 and a portion of the transmitter signal from transmitter power amplifier 90. Transmitter amplifier 90 will provide its output signal energy into output-/input tank and antenna coupling circuit and transmitter phase cancellation circuit 89. A signal to be transmitted will then be applied to antenna 10 with a small portion being bled off, so to speak, by coupling coil 36. A signal received by antenna 10 will also be transmitted to coupling coil 36 and applied to tank circuit 37 there to be applied to converter 84 where an intermediate frequency resulting from the frequency of the local transmitter and the received signal will be developed. Again, as before, this intermediate frequency signal is applied to intermediate frequency amplifier 85 and thence to detector 86 and audio frequency amplifier 87 and finally to output transducer 88.

Figure 16:
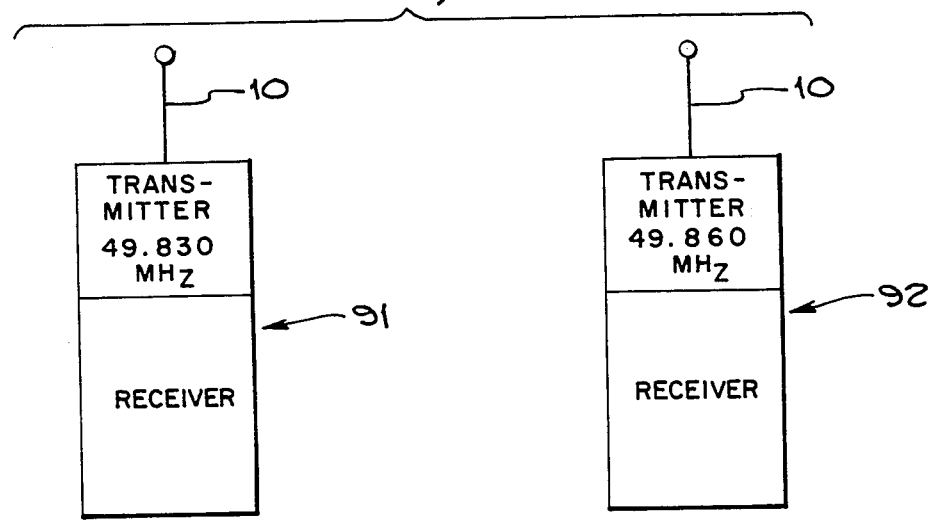
FIG. 16 is a general conceptual configuration of an implementation of the invention.

An example of the full duplex communications system is given in FIG. 16 where the two transmitter frequencies involved have again been chosen as 49.830 MHz and 49.860 MHz. The first transmitter/receiver station 91 comprises antenna 10, a transmitter operating at 49.830 MHz and a receiver. The second transmitter/receiver station 92 comprises an identical antenna 10, a transmitter operating at 49.860 MHz and a receiver. Transmissions from either station to the other will develop an intermediate frequency of 30 KHz in their respective receivers. In neither case will a local receiver be swamped by the signal from its local transmitter. This is so because of the unique circuit configuration of the invention.

Figure 17:
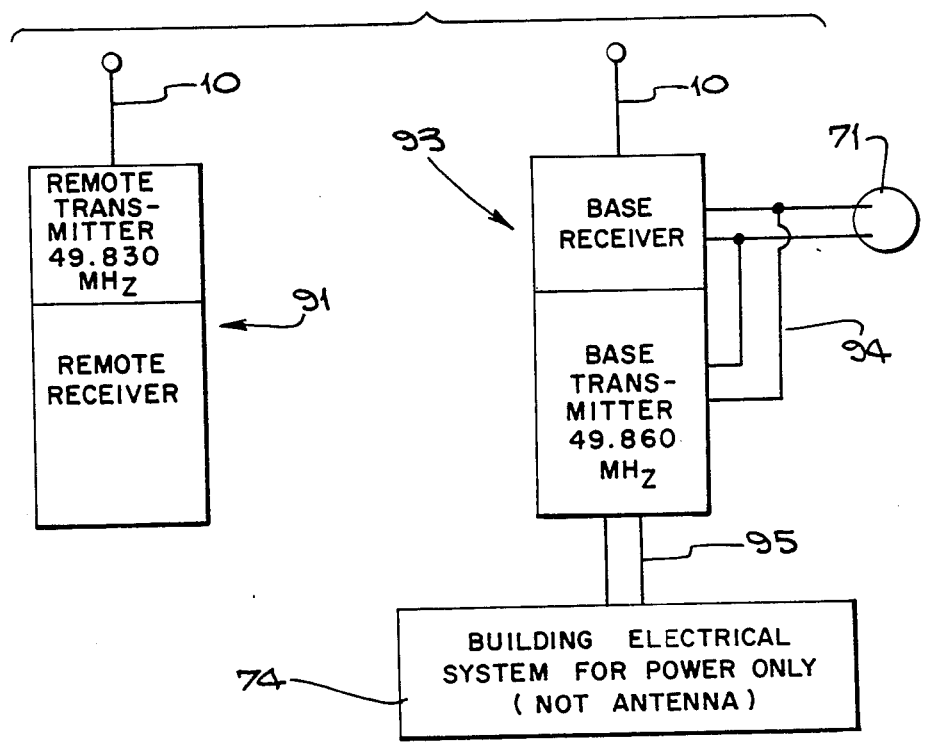
FIG. 17 is a general conceptual configuration of an application of the invention to cordless telephones.

FIG. 17 illustrates a cordless telephone application of the invention. The base transmitter/receiver station 93 will comprise a base receiver and a base transmitter operating at, for example, 49.860 MHz. Receiver and transmitter will be hard-wired by means of hard-wire telephone connecting wires 94 to the hard-wire telephone system within the building by means of receptacle 71. This base transmitter/receiver will also be wired to the building electrical system 74 by means of hard-wire electrical connecting wires 95. It is to be noted that the building electrical system is not to be used as in the prior art as transmission antenna for this base station. This has been made unnecessary by reason of the higher frequency transmitting signal contemplated in the present invention vis-a-vis the lower frequency known in the prior art. Remote transmitter/receiver 91 may have the same configuration as one of the receivers illustrated in FIG. 16. What is needed is a different transmitter frequency from the transmitter frequency of base station 93. Here a transmitter frequency of 49.830 MHz has been illustrated so as to develop an intermediate frequency of 30 KHz between signals. As noted above, an additional remote station employing a transmitting frequency of 49.890 MHz may additionally be implemented if desired.

Thus, there has been described a duplex communications system that will permit the simultaneous functions of signal transmission and signal reception. Great improvements in convenience of communication, ease of operation and economy have been provided through the novel advantages of the invention.

It is pointed out that although the present invention has been shown and described with reference to particular embodiments, nevertheless various changes and modifications, obvious to one skilled in the art to which the invention pertains, are deemed to lie within the purview of the invention.

We claim:

1. The method of operating a communications system having a transmitter circuit, a receiver circuit, and an input-output circuit in both the transmit mode and the receive mode concurrently on different but closely spaced carrier frequencies, comprising the steps of:

generating a transmitter carrier frequency output signal in the transmitter circuit and applying it to the input-output circuit;

concurrently with the generation of said transmitter output signal, generating an image signal which is nearly equal in magnitude to said carrier frequency output signal and of substantially opposite phase;

summing said transmitter output signal and said image signal to produce a greatly attenuated version of said output signal to serve as a local oscillator signal;

applying said local oscillator signal to the receiver circuit to assure an acceptable signal level incident at said receiver circuit;

receiving an incoming signal of a different but closely spaced carrier frequency at the input-output circuit;

directing the incoming signal to the receiver circuit so that said local oscillator signal and the incoming signal presented to said receiver circuit are of compatible magnitudes; and utilizing said receiver circuit to produce a heterodyne action between said incoming and local oscillator signals so as to enable recovery of the intelligence carried by the incoming signal.

2. The method of claim 1 wherein the step of summing said transmitter output signal and said image signal to produce a greatly attenuated version of said output signal to serve as a local oscillator signal includes the steps of;

selecting a transmitter transformer having a primary winding and first and second, substantially identical, secondary windings;

applying said transmitter output signal to said primary winding;

connecting one end of said first secondary winding to said input-output circuit and the other end to a common circuit potential point;

selecting a coupling coil having two ends;

connecting one end of said second secondary winding to said input-output circuit so that it is in-phase with said first secondary winding;

connecting the other end of said second secondary winding to one end of said coupling coil; and connecting the other end of said coupling coil to said common circuit potential point so that said coupling coil will contain a fraction comprising a greatly attenuated version of said transmitter output signal to act as a local oscillator signal to be combined with a different but closely spaced carrier frequency signal to be received from a second radio station.

3. The method of claim 1 wherein the step of summing said transmitter output signal and said image signal to produce a greatly attenuated version of said output signal to serve as a local oscillator signal includes the steps of;

generating a first radio frequency carrier signal of predetermined frequency;

selecting a first tuned tank circuit;

applying said first carrier signal to said first tuned tank circuit;

coupling said first tuned tank circuit to a linking coil;

selecting a second tuned tank circuit;

coupling said linking coil both to said second tuned tank circuit and to said input-output circuit;

generating a second radio frequency carrier signal of said predetermined frequency but of phase opposite to said first carrier signal; and applying said second carrier signal to said second tank circuit so that said second tank circuit will contain a composite signal comprising an attenuated version of said transmitter output signal to act as a local oscillator signal to be combined with a different but closely spaced carrier frequency signal to be received from a second radio station.

4. The method of claim 1 wherein the step of summing said transmitter output signal and said image signal to produce a greatly attenuated version of said output signal to serve as a local oscillator signal includes the steps of;

generating a first radio frequency carrier signal of predetermined frequency;

selecting a first tuned tank circuit;

coupling said first tuned tank circuit to said input-output circuit;

applying said first carrier signal to said first tuned tank circuit;

coupling said first tuned tank circuit to a first summing capacitor;

generating a second radio frequency carrier signal of said predetermined frequency but of phase opposite to said first carrier signal;

selecting a second tuned tank circuit;

applying said second carrier signal to said second tank circuit;

coupling said second tuned tank circuit to a second summing capacitor;

coupling said first and second summing capacitors together at a summing point so that said first carrier signal and said second carrier signal of opposite phases substantially cancel each other so as to sum to a very low signal value producing in effect a local oscillator signal comprising a greatly attenuated version of said transmitter output signal;

selecting a third tuned tank circuit; and applying said summing point to said third tank circuit so that said third tank circuit will contain a composite signal comprising said local oscillator signal to be combined with a different but closely spaced carrier frequency signal to be received from a second radio station.

5. A communications station for use in a duplex communications system, the station being characterized by the ability to transmit and to receive concurrently on different but closely spaced carrier frequencies, the station comprising, in combination:

a transmitter circuit;

a receiver circuit including a demodulator;

an input-output circuit;

and an intermodulator circuit coupling said transmitter circuit, said receiver circuit, and said input-output circuit;

said intermodulator circuit comprising:

means for passing a transmitter output signal from said transmitter circuit for said input-output circuit;

means for generating an image signal which is nearly equal in magnitude and substantially opposite in phase to said transmitter output signal;

means for combining said transmitter output signal with said image signal to produce a greatly attenuated version of said transmitter output signal to act as a local oscillator signal;

means for applying said local oscillator signal to said demodulator; and means for passing a signal of a different but closely spaced carrier frequency applied from said receiver circuit to said input-output circuit to said demodulator;

whereby the difference between the transmitted and recieved carrier frequencies provides an intermediate frequency to which said demodulator is tuned to recover received information, said local oscillator signal having an energy level which is compatible with that of the received signal to promote efficient demodulation.

6. A communications stations as in claim 5 wherein said intermodulator circuit includes a transformer having a primary winding and two substantially identical secondary windings;

said transmitter output signal being coupled to said primary winding, one on said secondary windings being coupled to said input-output circuit, said two secondary windings being connected in a series loop circuit;

said series loop circuit also including means for developing a summation or difference signal from said two secondary windings and for applying same to said demodulator circuit to produce said local oscillator signal.

7. The intermodulator circuit of claim 6 wherein said means for developing a summation or difference signal includes a winding which has a small number of turns compared to said secondary windings.

8. The method of operating a communications system having a transmitter circuit, a receiver circuit, and an antenna configuration in both the transmit mode and the receive mode concurrently on different but closely spaced carrier frequencies, comprising the steps of:

generating in the transmitter circuit a transmitter output signal and applying it to the antenna configuration;

concurrently with the generation of said transmitter output signal, generating an image signal which is nearly equal to magnitude and substantially opposite in phase therewith;

summing said transmitter output signal and said image signal so as to produce a greatly weakened version of said output signal which in effect is a local oscillator signal;

applying said summed transmitter output signal and said image signal to the receiver circuit so as to prevent an unacceptable signal level from being incident at said receiver circuit;

directing a substantial portion of the energy of a incoming signal received at the antenna configuration to the receiver circuit so that said summed signals and the incoming signal presented to the receiver circuit are of comparable magnitudes; and utilizing the receiver circuit to produce a heterodyne action between the incoming and said summed signals so as to recover the intelligence carried by the incoming signal.

9. The method of claim 8 wherein the summing step includes the steps of:

selecting a transmitter transformer having a primary winding and having first and second substantially identical secondary windings;

applying said transmitter output signal to said primary winding;

connecting one end of said first secondary winding to said antenna configuration and the other end to a common circuit potential point;

selecting a coupling coil having two ends;

connecting one end of said second secondary winding to said antenna configuration so that it is in-phase with said first secondary winding;

connecting the other end of said second secondary winding to one end of said coupling coil; and connecting the other end of said coupling coil to said common circuit potential point thus preventing an unacceptable signal level from being incident at said receiver and so that said coupling coil will contain a greatly attenuated version of said transmitter output signal to act as a local oscillator signal combined with an incoming signal at a different but closely spaced carrier frequency to be received by said antenna configuration from a second radio station.

10. The method of claim 8 wherein the summing step includes the steps of:

generating a first radio frequency carrier signal of predetermined frequency;

selecting a first tuned tank circuit;

selecting a low impedance link having two linking windings;

coupling said first tuned tank circuit to one of said linking windings;

selecting a second tuned tank circuit;

coupling the other of said linking windings both of said second tuned tank circuit and to said antenna configuration;

generating a second radio frequency carrier signal of said predetermined frequency but of phase opposite to said first carrier signal;

selecting a third tuned tank circuit;

applying said second radio frequency carrier signal to said third tuned tank circuit so as to obtain an output signal therefrom also of phase opposite to said first carrier signal;

applying said opposite phase output signal to said second tuned tank circuit so that said second tank circuit will contain a composite signal comprising a greatly attenuated version of said transmitter output signal acting as a local oscillator signal and an incoming signal of a different but closely spaced carrier frequency received by said antenna configuration.

11. The method of claim 8 wherein the summing step includes the steps of:

generating a first radio frequency carrier signal of predetermined frequency;

selecting a first tuned tank circuit;

coupling said first tuned tank circuit to said antenna configuration;

applying said first carrier signal to said first tuned tank circuit;

coupling said first tuned tank circuit to a first summing capacitor;

generating a second radio frequency carrier signal of said predetermined frequency but of opposite phase of said first carrier signal;

selecting a second tuned tank circuit;

applying said second carrier signal to said second tuned tank circuit;

coupling said second tuned tank circuit to a second summing capacitor;

coupling said first and second summing capacitors together at a summing point so that said first carrier signal and said second carrier signal, of opposite phase to said first carrier signal, substantially cancel each other so as to sum to a very low signal value producing, in effect, a local oscillator signal;

selecting a third tuned tank circuit;

applying said summing point to said third tuned circuit so that said third tank circuit will contain a composite signal comprising said local oscillator signal and an incoming signal of a different but closely spaced carrier frequency to be received by said antenna configuration.

12. In the method of achieving full duplex radio communication in a system wherein each unit has a transmitter and receiver operating on closely spaced carrier frequencies differing by an intermediate frequency, the improvement comprising the steps of:

deriving a portion of the transmitter carrier frequency signal;

splitting said portion of said transmitter carrier frequency signal into first and second parts;

inverting the phase of one of said parts relative to the other;

thereafter combining the inverted and non-inverted parts to produce a resultant signal of non-zero magnitude; and then applying said resultant signal to the receiver to act as a local oscillator signal to aid in the extraction of a modulated intermediate frequency signal from a received signal.

13. The method of achieving duplex radio communications between at least first and second radio stations in a communications system in which each station has a transmitter circuit, a receiver circuit, and an input-output circuit, operating each station in both the transmit mode and the receive mode concurrently on different but closey spaced carrier frequencies, which includes the steps of:

generating in the transmitter circuit of said first station a transmitter output signal and applying it to the input-output circuit thereof so as to transmit radio signals from said first radio station at a first carrier frequency;

receiving said radio signals from said first radio station at said second radio station;

receiving said radio signals from said second radio station at said first radio station;

intermodulating at each of said radio stations a predetermined fraction of each transmitter output signal generated at that station with the radio signals received at that station so as to produce first and second signals at said intermediate frequency, respectively, including the steps of;

generating a first radio frequency carrier signal of predetermined frequency;

selecting a first tuned tank circuit;

coupling said first tuned tank circuit to said input-output circuit;

applying said first carrier signal to said first tuned tank circuit;

coupling said first tuned tank circuit to a first summing capacitor;

generating a second radio frequency carrier signal of said predetermined frequency but of opposite phase to said first carrier signal;

selecting a second tuned tank circuit;

applying said second carrier signal to said second tuned tank circuit;

coupling said second tuned tank circuit to a second summing capacitor;

coupling said first and second summing capacitors together at a summing point so that said first carrier signal and said second carrier signal, of opposite phase to said first carrier signal, substantially cancel each other so as to sum to a very low signal value producing, in effect, a local oscillator signal;

selecting a third tuned tank circuit;

applying said summing point to said third tuned circuit so that said third tank circuit will contain a composite signal comprising a predetermined fraction of the transmitter output signal generated in the transmitter circuit of each such station, said composite signal being used to generate said first and second intermediate frequency signals at respective radio stations; and demodulating and utilizing said first and second signals at said intermediate frequency at the respective stations to recover transmitted information modulated upon the carrier frequencies.

14. The method of operating a communications system having a transmitter circuit, a receiver circuit, and an input-output circuit in both the transmit mode and the receive mode concurrently on different but closeley spaced carrier frequencies, comprising the steps of:

generating in the transmitter circuit a transmitter output signal and applying it to the input-output circuit;

concurrently with the generation of said transmitter output signal, generating an image signal which is nearly equal in magnitude and substantially opposite in phase therewith;

summing said transmitter output signal and said image signal so as to produce a greatly weakened version of said output signal which in effect is a local oscillator signal, including the steps of;

generating a first radio frequency carrier signal of predetermined frequency;

selecting a first tuned tank circuit;

coupling said first tuned tank circuit to said input-output circuit;

applying said first carrier signal to said first tuned tank circuit;

coupling said first tuned tank circuit to a first summing capacitor;

generating a second radio frequency carrier signal of said predetermined frequency but of opposite phase to said first carrier signal;

selecting a second tuned tank circuit;

applying said second carrier signal to said second tuned tank circuit;

coupling said second tuned tank circuit to a second summing capacitor;

coupling said first and second summing capacitors together at a summing point so that said first carrier signal and said second carrier signal, of opposite phase to said first carrier signal, substantially cancel each other so as to sum to a very low signal value producing, in effect, a local oscillator signal;

selecting a third tuned tank circuit;

applying said summing point to said third tuned circuit so that said third tank circuit will contain a composite signal comprising a predetermined fraction of the transmitter output signal generated in the transmitter circuit acting as a local oscillator signal;

applying said local oscillator signal to the receiver circuit;

directing a substantial portion of the energy of an incoming signal received at the input-output circuit to the receiver circuit so that said local oscillator signal and the incoming signal presented to the receiver circuit are of comparable magnitude; and utilizing the receiver circuit to produce a heterodyne action between the incoming and local oscillator signals so as to recover the intelligence carried by the incoming signal.

15. A radio communications station comprising:

a transmitter that generates radio signal energy at a first carrier frequency;

an antenna that both receives and transmits radio signal energy responsive to said radio signals generated by said transmitter;

an intermediate frequency amplifier which receives and amplifies modulated intermediate frequency signals derived from radio signals received by said antenna;

an intermodulator that couples said antenna both to said transmitter and to said intermediate frequency amplifier, said intermodulator including;

a first tank circuit responsive to said radio signal energy generated in said transmitter;

a linking coil linking said first tank circuit to said antenna;

a second tank circuit also linked to said linking coil;

a third tank circuit responsive to the radio signal generated in said transmitter but of opposite phase, connected to said second tank circuit so as to sum said out-of-phase signal components to produce a greatly weakened version of said transmitter signal which is, in effect, a local oscillator signal;

said intermodulator providing the product of a predetermined small fraction of said radio signal energy by said transmitter with substantially all of the radio signal energy received by said antenna at a second carrier frequency to said intermediate frequency amplifier;

a demodulator responsive to output signals from said intermediate frequency amplifier to demodulate said output signals; and utilizing means coupled to said demodulator for utilizing the signals therefrom.

16. A radio communications station comprising:

a transmitter that generates radio signal energy at a first carrier frequency;

an antenna that both receives and transmits radio signal energy responsive to said radio signals generated by said transmitter;

an intermediate frequency amplifier which receives and amplifies modulated intermediate frequency signals derived from radio signals received by said antenna;

an intermodulator that couples said antenna both to said transmitter and to said intermediate frequency amplifier, said intermodulator including;

a first tank circuit responsive to said radio signal energy generated in said transmitter;

a first summing capacitor connected to said first tank circuit;

a second tank circuit responsive to the radio signal generated in said transmitter but of opposite phase;

a second summing capacitor connected to said second tank circuit and to said first summing capacitor, the junction of said first and second summing capacitors providing a greatly weakened version of said transmitter signal corresponding to a local oscillator signal;

said intermodulator providing the product of a greatly weakened version of said transmitter signal by said transmitter with substantially all of the radio signal energy received by said antenna at a second carrier frequency to said intermediate frequency amplifier;

a demodulator responsive to output signals from said intermediate frequency amnplifier to demodulate said output signals; and utilizing means coupled to said demodulator for utilizing the signals therefrom.

17. The method of operating a communications system having a transmitter circuit, a receiver circuit, and an antenna configuration in both the transmit mode and the receive mode concurrently on different but closely spaced carrier frequencies, comprising the steps of:

generating in the transmitter circuit a transmitter output signal and applying it to the antenna configuration;

concurrently with the generation of said transmitter output signal, generating an image signal which is nearly equal in magnitude and substantially opposite in phase therewith;

summing said transmitter output signal and said image signal so as to produce a greatly weakened version of said output signal which in effect is a local oscillator signal, including the steps of;

generating a first radio frequency carrier signal of predetermined frequency;

selecting a first tuned tank circuit;

applying said first carrier signal to said first tuned tank circuit;

selecting a low impedance link having two linking windings;

coupling said first tuned tank circuit to one of said linking windings;

selecting a second tuned tank circuit;

coupling the other of said linking windings both to said second tuned tank circuit and to said antenna configuration;

generating a second radio frequency carrier signal of said predetermined frequency but of opposite phase to said first carrier signal;

selecting a third tuned tank circuit;

applying said second radio frequency carrier signal to said third tuned tank circuit so as to obtain an output signal therefrom also of opposite phase to said first carrier signal;

applying said output signal of opposite phase to said second tuned tank circuit so that said second tank circuit will contain a composite signal comprising a greatly weakened version of the transmitter output signal generated in the transmitter circuit acting as a local oscillator signal and the incoming signal received by said antenna configuration;

applying said local oscillator signal to the receiver circuit;

directing a substantial portion of the energy of an incoming signal received at the antenna configuration to the receiver circuit so that said local oscillator signal and the incoming signal presented to the receiver circuit are of comparable magnitude; and utilizing the receiver circuit to produce a heterodyne action between the incoming and local oscillator signals so as to recover the intelligence carried by the incoming signal.

18. The method of operating a communications system having a transmitter circuit, a receiver circuit, and an antenna configuration in both the transmit mode and the receive mode concurrently on different but closely spaced carrier frequencies, comprising the steps of:

generating in the transmitter circuit a transmitter output signal and applying it to the antenna configuration;

concurrently with the generation of said transmitter output signal, generating an image signal which is nearly equal in magnitude and substantially opposite in phase therewith;

summing said transmitter output signal and said image signal so as to produce a greatly weakened version of said output signal which in effect is a local oscillator signal, including the steps of;

generating a first radio frequency carrier signal of predetermined frequency;

selecting a first tuned tank circuit;

coupling said first tuned tank circuit to said antenna configuration;

applying said first carrier signal to said first tuned tank circuit;

coupling said first tuned tank circuit to a first summing capacitor;

generating a second radio frequency carrier signal of said predetermined frequency but of opposite phase to said first carrier signal;

selecting a second tuned tank circuit;

applying said second carrier signal to said second tuned tank circuit;

coupling said second tuned tank circuit to a second summing capacitor;

coupling said first and second summing capacitors together at a summing point so that said first carrier signal and said second carrier signal, of opposite phase to said first carrier signal, substantially cancel each other so as to sum to a very low signal value producing, in effect, a local oscillator signal;

selecting a third tuned tank circuit;

applying said summing point to said third tuned tank circuit so that said third tank circuit will contain a composite signal comprising a predetermined fraction of the transmitter output signal generated in the transmitter circuit acting as a local oscillator signal and the incoming signlal received by said antenna configuration;

applying said local oscillator signal to the receiver circuit;

directing a substanttial portion of the energy of an incoming signal received at the antenna configuration to the receiver circuit so that said local oscillator signal and the incoming signal presented to the receiver circuit are of comparable magnitude; and utilizing the receiver circuit to produce a heterodyne action between the incoming and local oscillator signals so as to recover the intelligence carried by the incoming signal.

19. In apparatus for achieving full duplex radio communication in a system wherein each unit has a transmitter and a receiver operating on closely spaced carrier frequencies differing by an intermediate frequency, the improvementt in each unit comprising:

first means for deriving a portion of the transmitter carrier frequency signal;

second means connected to said first means for splitting said portion of said transmitter carrier frequency signal into first and second parts;

third means connected to said second means for inverting the phase of one of said parts relative to the other;

fourth means connected to said second means and said third means for combining the inverted and non-inverted parts to produce a resultant signal of non-zero magnitude; and fifth means connecting said fourth means to the receiver for applying said resultant signal to act as a local oscillator signal to aid in the extraction of a modulated intermediate frequency signal from a received signal of a different but closely spaced carrier frequency.

* * * * *